(12) United States Patent
Sugaya

(10) Patent No.: US 12,294,244 B2
(45) Date of Patent: May 6, 2025

(54) ROTOR, ROTATING ELECTRICAL MACHINE, AND DRIVE DEVICE

(71) Applicant: NIDEC CORPORATION, Kyoto (JP)

(72) Inventor: Atsushi Sugaya, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 443 days.

(21) Appl. No.: 17/672,593

(22) Filed: Feb. 15, 2022

(65) Prior Publication Data

US 2022/0271586 A1    Aug. 25, 2022

(30) Foreign Application Priority Data

Feb. 24, 2021    (JP) .................................. 2021-027554

(51) Int. Cl.
*H02K 1/2791* (2022.01)
*H02K 1/28* (2006.01)
*H02K 15/03* (2025.01)

(52) U.S. Cl.
CPC ............. *H02K 1/2791* (2022.01); *H02K 1/28* (2013.01); *H02K 15/03* (2013.01)

(58) Field of Classification Search
CPC .......... H02K 1/28; H02K 15/03; H02K 1/276; H02K 21/14; H02K 1/2791; H02K 1/27
USPC ........................................................ 310/156
See application file for complete search history.

(56) References Cited

U.S. PATENT DOCUMENTS

| 5,581,140 A * | 12/1996 | Futami | ..................... H02K 15/03 |
| | | | 310/156.53 |
| 8,492,502 B2 | 7/2013 | Lee et al. | |
| 2006/0186752 A1 * | 8/2006 | Matsumoto | ............. B60L 15/20 |
| | | | 310/156.53 |
| 2014/0103574 A1 * | 4/2014 | Ishimatsu | ................ H02K 1/28 |
| | | | 264/261 |
| 2015/0069863 A1 * | 3/2015 | Papini | .................. H02K 1/2766 |
| | | | 310/46 |

(Continued)

FOREIGN PATENT DOCUMENTS

| JP | 2007282392 A | 10/2007 |
| JP | 201155641 A | 3/2011 |

(Continued)

OTHER PUBLICATIONS

Ikemoto, "Rotor", 2016, English Machine Translation (Year: 2016).*

*Primary Examiner* — Terrance L Kenerly
*Assistant Examiner* — Theodore L Perkins
(74) *Attorney, Agent, or Firm* — HAUPTMAN HAM, LLP

(57) ABSTRACT

A rotor includes a magnet, a rotor core having an axially extending hole in which the magnet is accommodated, and a resin in the hole. The rotor core includes a first block and a second block that is arrayed in an axial direction together with the first block and is arranged such that a circumferential position of the hole is shifted with respect to the first block. Each of the first and second blocks has a resin groove that communicates with the hole included in each block, extends axially, and receives the resin. The resin groove of the first block and the resin groove of the second block are at least partially overlapped and connected in the axial direction, or are connected via the resin groove included in at least one other block disposed between the first and second blocks in the axial direction.

24 Claims, 16 Drawing Sheets

(56) References Cited

U.S. PATENT DOCUMENTS

| | | | | |
|---|---|---|---|---|
| 2015/0130318 A1* | 5/2015 | Kitada | ................... | C08L 63/00 |
| | | | | 523/466 |
| 2018/0102698 A1* | 4/2018 | Iwamoto | ................ | H02K 15/12 |
| 2019/0123606 A1* | 4/2019 | Arai | ........................ | H02K 1/28 |
| 2022/0368203 A1 | 11/2022 | Tanaka | | |

FOREIGN PATENT DOCUMENTS

| | | | |
|---|---|---|---|
| JP | 2011055687 A | | 3/2011 |
| JP | 2014236526 A | | 12/2014 |
| JP | 2018085864 A | * | 5/2018 |

* cited by examiner

ROTOR, ROTATING ELECTRICAL MACHINE, AND DRIVE DEVICE

CROSS-REFERENCE TO RELATED APPLICATIONS

The present invention claims priority under 35 U.S.C. § 119 to Japanese Patent Application No. 2021-027554 filed on Feb. 24, 2021, the entire content of which is incorporated herein by reference.

FIELD OF THE INVENTION

The present disclosure relates to a rotor, a rotating electrical machine, and a drive device.

BACKGROUND

Conventionally, a rotor laminated core manufactured by fixing a permanent magnet to a laminated body by resin sealing is known. In a rotating electrical machine including a permanent magnet rotor, the rotor has a skew structure in order to reduce cogging torque. In the skew structure, the laminated rotor core is divided into a plurality of pieces in the lamination direction together with the permanent magnet, and each divided rotor core is shifted by a predetermined angle and assembled.

The permanent magnet is inserted into a magnet insertion portion of the rotor core and is bonded and fixed with a filler. In the skew structure, since the positions of the magnet insertion portions are shifted between the divided rotor cores, when the magnet insertion portions are filled with a filler after the plurality of divided rotor cores are stacked, there is a possibility that the filler is not sufficiently filled in the magnet insertion portions. For this reason, conventionally, the filler is filled in the magnet insertion portion for each divided stage. However, in this case, the work time easily becomes long.

For this reason, it is known that a rotor including a skewed rotor core divided into a plurality of stages in the axial direction and arranged with a phase angle in the circumferential direction between the stages and a permanent magnet forming a pole has the following configuration. The rotor core has an insertion hole for inserting a permanent magnet, and at least one intermediate hole provided between poles independently of the insertion hole. The insertion hole of a rotor core in a certain stage communicates with the intermediate hole of an adjacent stage. According to the present configuration, since the supply path of the filler to the insertion hole of the permanent magnet can be secured by the intermediate hole, the rotor having a skewed rotor core can be manufactured at low cost.

In the case of the above-described configuration in which the intermediate hole is provided between the poles formed by the permanent magnet, there is a possibility that the intermediate hole affects magnetic characteristics in relation to, for example, an angle at which the permanent magnet is provided. Therefore, another technology capable of efficiently manufacturing a skewed rotor core is desired.

SUMMARY

An exemplary rotor of the present disclosure is a rotor that is used in an inner rotor type rotating electrical machine and has a plurality of magnetic poles in a circumferential direction about a central axis extending vertically, the rotor including a magnet that constitutes each of the magnetic poles, a rotor core that has an axially extending accommodation hole for accommodating the magnet, and a resin that is put into the accommodation hole. The rotor core includes a first block and a second block that is arrayed in an axial direction together with the first block and is arranged such that a circumferential position of the accommodation hole is shifted with respect to the first block. The first block and the second block each have a resin groove that communicates with the accommodation hole included in each block, extends from an axial upper end to lower end, and receives the resin. The resin groove of the first block and the resin groove of the second block are at least partially overlapped and connected in the axial direction, or are connected via the resin groove included in at least one other block disposed between the first block and the second block in the axial direction.

An exemplary rotating electrical machine of the present disclosure includes a rotor having the above configuration and a stator disposed radially outward of the rotor.

An exemplary drive device of the present disclosure includes a rotating electrical machine having the above configuration and a gear unit connected to the rotating electrical machine.

The above and other elements, features, steps, characteristics and advantages of the present disclosure will become more apparent from the following detailed description of the preferred embodiments with reference to the attached drawings.

DETAILED DESCRIPTION

Figure 1:
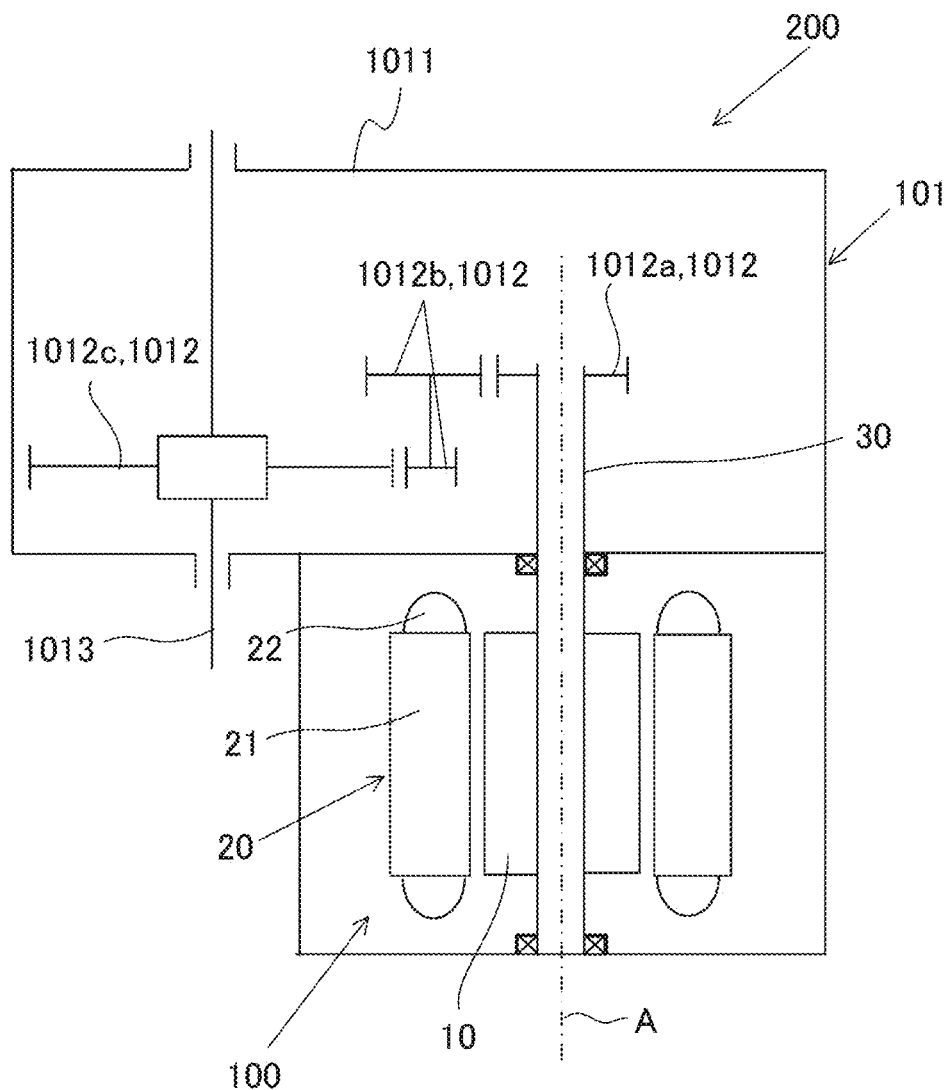
FIG. 1 is a view schematically showing a configuration of a drive device according to an preferred embodiment of the present disclosure.

Exemplary embodiments of the present disclosure will be described below in detail with reference to the drawings. In the present description, a direction in which a central axis A of a rotating electrical machine 100 extends is simply referred to as an "axial direction", "axial", or "axially". A radial direction and a circumferential direction about the central axis A of the rotating electrical machine 100 are simply referred to as a "radial direction" and "circumferential direction", respectively, as shown in FIG. 1. Similarly, regarding a rotor 10, directions coinciding with the axial direction, the radial direction, and the circumferential direction of the rotating electrical machine 100 in a state of being incorporated in the rotating electrical machine 100 are simply referred to as an "axial direction", "radial direction", and a "circumferential direction", respectively. A direction in which a tangent of a circle about the central axis A extends is simply referred to as a "tangential direction", "tangential", or "tangentially" In the present description, the axial direction when the rotating electrical machine is disposed in the direction shown in FIG. 1 is defined as a vertical direction. Note that a vertical direction is a name simply used for a description, and does not limit an actual positional relationship and a direction.

FIG. 1 is a view schematically showing the configuration of a drive device 200 according to an preferred embodiment of the present disclosure. As shown in FIG. 1, the drive device 200 includes the rotating electrical machine 100 and a gear unit 101 connected to the rotating electrical machine 100.

In the present preferred embodiment, the rotating electrical machine 100 is a motor. However, the technology of the present disclosure may be applied to a rotating electrical machine configured as a generator. The rotating electrical machine 100 includes the rotor 10 and a stator 20 disposed radially outward of the rotor 10. That is, the rotating electrical machine 100 is an inner rotor type rotating electrical machine.

The rotor 10 includes a field magnet 11 (see FIG. 2 described later and the like) embedded inside of the rotor 10. That is, the rotating electrical machine 100 is an interior permanent magnet (IPM) type rotating electrical machine. The details of the rotor 10 will be described later.

The stator 20 is an armature of the rotating electrical machine 100. The stator 20 is cylindrical about the central axis A. The stator 20 faces, across a gap, the rotor 10 disposed radially inward and surrounds the rotor 10. More specifically, the stator 20 has a stator core 21 and a coil 22. The stator core 21 includes a cylindrical core back extending in the axial direction, and a plurality of teeth extending radially inward from the core back. The coil 22 is configured by winding a conductive wire around the teeth of the stator core 21 via an insulator not shown. Once a drive current is supplied to the coil 22, a radial magnetic flux is generated in the teeth of the stator core 21. Thus, a circumferential torque is generated in the rotor 10, and the rotor 10 rotates about the central axis A.

The rotating electrical machine 100 further includes a columnar shaft 30 extending in the axial direction. The shaft 30 is disposed radially inward relative to the rotor 10 and is fixed to the rotor 10. The shaft 30 rotates about the central axis A together with the rotor 10. In the present preferred embodiment, the upper end of the shaft 30 is inserted into a casing 1011 of the gear unit 101.

The gear unit 101 includes a plurality of gears 1012 in the casing 1011. The plurality of gears 1012 include a shaft gear 1012a, at least one intermediate gear 1012b, and an output shaft gear 1012c. The shaft gear 1012a is attached to the upper end of the shaft 30. The output shaft gear 1012c is attached to an output shaft 1013 of the drive device 200. The intermediate gear 1012b transmits rotation of the shaft gear 1012a to the output shaft gear 1012c. When the shaft 30 rotates, the shaft gear 1012a rotates, force of the rotation is transmitted to the output shaft gear 1012c via the intermediate gear 1012b, and the output shaft 1013 rotates.

As described later, since the rotor 10 having the skew structure of the present disclosure can be efficiently manufactured, the rotating electrical machine 100 and the drive device 200 of the present disclosure can be manufactured at low cost.

Next, details of the rotor 10 will be described. The rotor 10 is used for the inner rotor type rotating electrical machine 100. The rotor 10 has a plurality of magnetic poles in the circumferential direction about the central axis A extending in the vertical direction.

Figure 2:
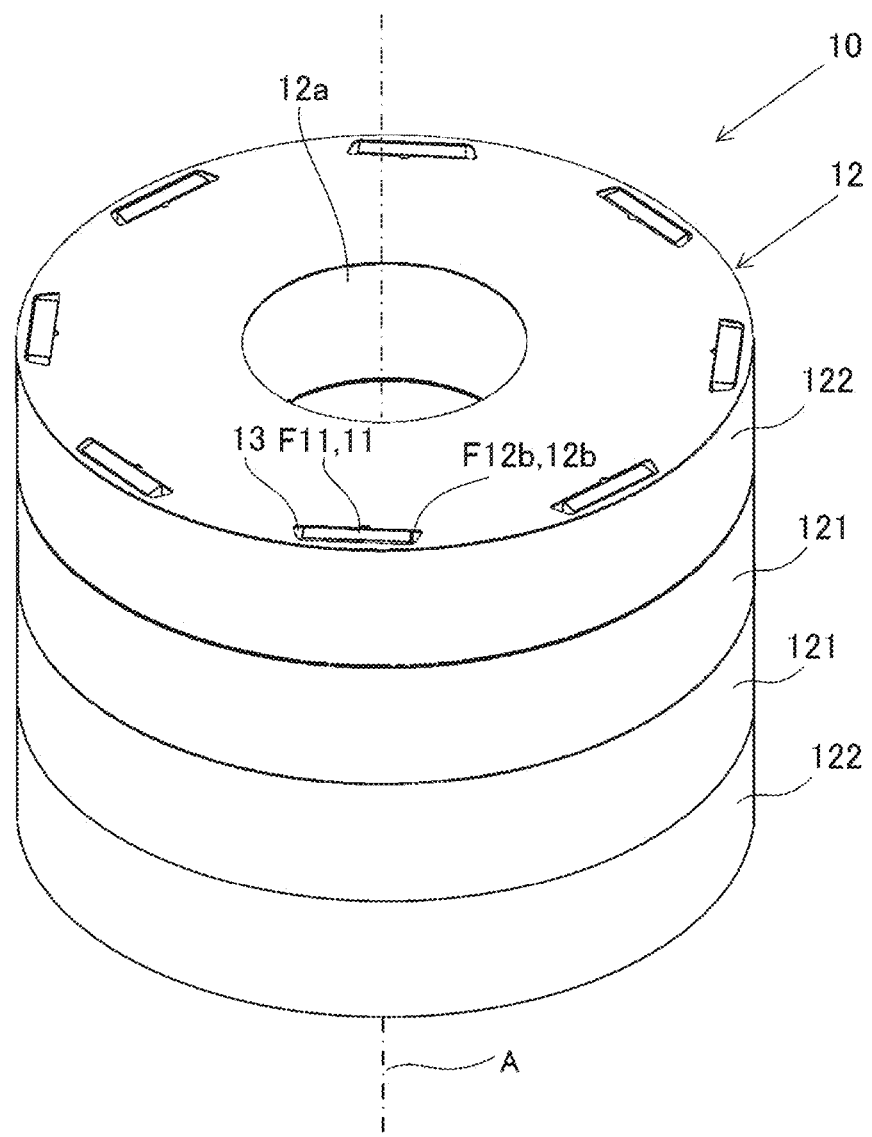
FIG. 2 is a perspective view showing an outline configuration of a rotor of a first preferred embodiment.

FIG. 2 is a perspective view showing an outline configuration of a rotor 10 of the first preferred embodiment. As shown in FIG. 2, the rotor 10 includes the magnet 11, a rotor core 12, and a resin 13.

The magnet 11 constitutes each magnetic pole. In the present preferred embodiment, the number of magnetic poles of the rotor 10 is 8. The rotor 10 includes the magnet 11 constituting each of the eight magnetic poles. The magnet 11 is disposed radially outer circumferential side of the rotor core 12. The magnet 11 is a field permanent magnet, and may be, for example, a sintered magnet, a bond magnet, or the like. The number of magnetic poles of the rotor 10 may be a plurality other than 8.

The rotor core 12 is cylindrical about the central axis A. The rotor core 12 includes magnetic steel plates laminated in the axial direction. The magnetic steel plate is, for example, a silicon steel plate. The rotor core 12 has an insertion hole 12a axially penetrating at the central portion. The shaft 30 (see FIG. 1) is inserted into the insertion hole 12a. That is, the rotor core 12 has the insertion hole 12a through which the shaft 30 is inserted.

The rotor core 12 has an axially extending accommodation hole 12b for accommodating the magnet 11. The accommodation hole 12b is disposed radially outer circumferential side of the rotor core 12. The accommodation hole 12b accommodates the magnet 11 constituting each magnetic pole. A plurality of the accommodation holes 12b are arranged at intervals in the circumferential direction. In the present preferred embodiment, since the number of magnetic poles is 8, the number of arrangement positions of the accommodation holes 12b is also 8. The eight arrangement positions of the accommodation holes 12b are arrayed at equal intervals in the circumferential direction.

The resin 13 is put into the accommodation hole 12b. More specifically, the resin 13 is disposed in a part in the accommodation hole 12b other than the part where the magnet 11 is disposed. The resin 13 is put into each of the plurality of accommodation holes 12b. The resin 13 fixes the magnet 11 put in the accommodation hole 12b to the rotor core 12. The resin 13 may be, for example, an epoxy resin or the like.

More specifically, the rotor core 12 of the rotor 10 configured as described above is divided into a plurality of blocks arranged side by side in the axial direction. The rotor core 12 includes a first block 121 and a second block 122. The second block 122 is arrayed in the axial direction together with the first block 121 and arranged with the position of the accommodation hole 12b shifted with respect to the first block 121. That is, the first block 121 and the second block 122 have a skewed configuration where they are arranged with a phase angle in the circumferential direction. With such a skewed configuration, cogging torque can be suppressed.

Since the rotor core 12 is divided into a plurality of blocks and the plurality of blocks are skewed, more specifically, the magnet 11 constituting each magnetic pole is also divided into a plurality of pieces. The accommodation hole 12b for accommodating the magnet 11 provided corresponding to each magnetic pole is also provided for each block, more specifically. In each block, the accommodation hole 12b penetrates in the axial direction.

Figure 3:
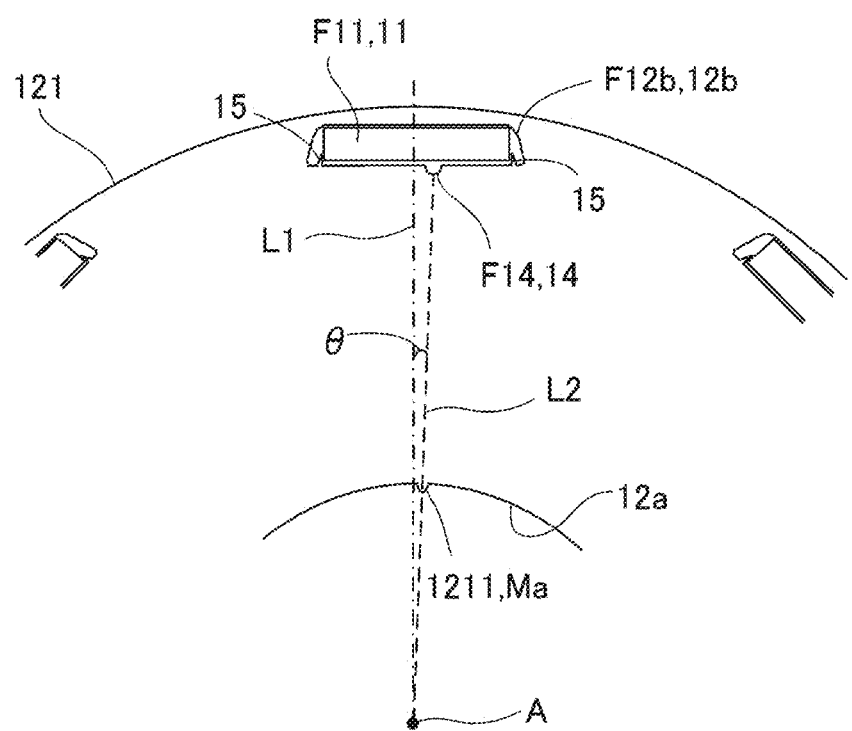
FIG. 3 is an outline plan view showing, in an enlarged manner, a part of a first block included in a rotor core of the first preferred embodiment.
Figure 4:
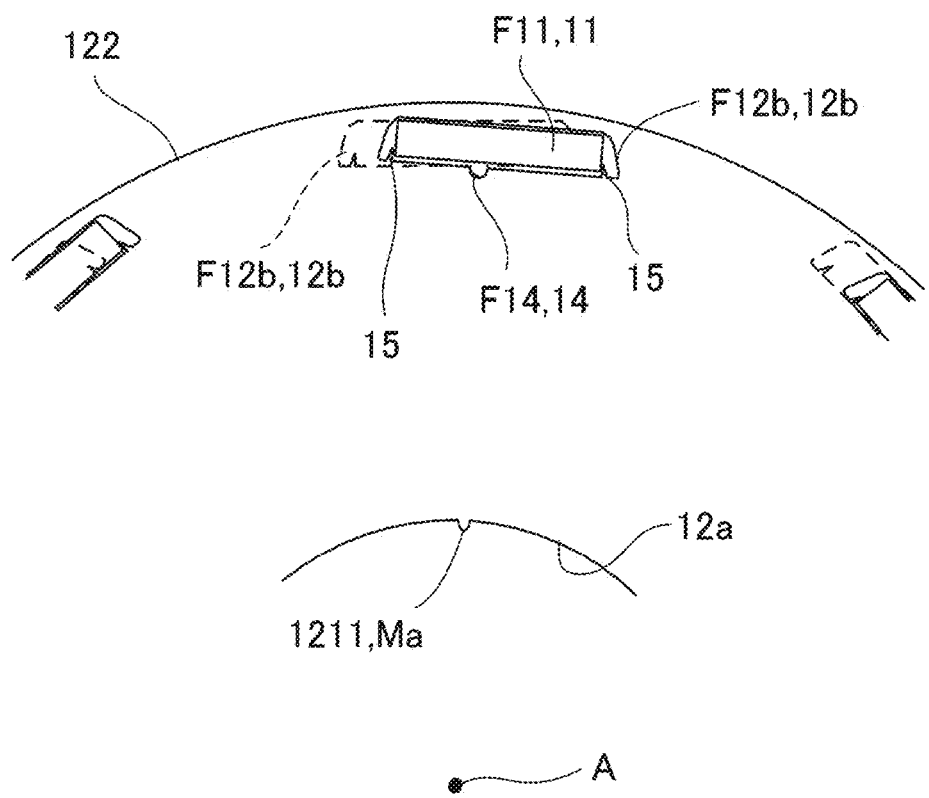
FIG. 4 is an outline plan view showing, in an enlarged manner, a part of a second block included in the rotor core of the first preferred embodiment.
Figure 5:
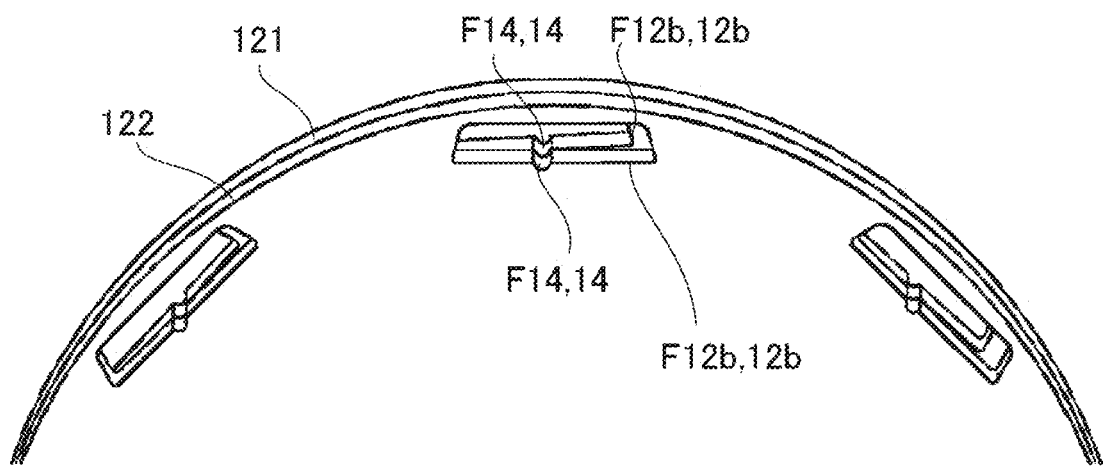
FIG. 5 is an outline perspective view showing, in an enlarged manner, a part of the first block and the second block included in the rotor core of the first preferred embodiment when viewed obliquely from above.

FIG. 3 is an outline plan view showing, in an enlarged manner, a part of the first block 121 included in the rotor core 12 of the first preferred embodiment. FIG. 4 is an outline plan view showing, in an enlarged manner, a part of the second block 122 included in the rotor core 12 of the first preferred embodiment. FIG. 5 is an outline perspective view showing, in an enlarged manner, a part of the first block 121 and the second block 122 included in the rotor core 12 of the first preferred embodiment when viewed obliquely from above. The accommodation hole 12b indicated by a broken line in FIG. 4 is an accommodation hole included in the first block 121. In FIG. 5, the second block 122 is disposed above the first block 121.

As shown in FIGS. 4 and 5, in each magnetic pole, since the accommodation hole 12b of the first block 121 and the accommodation hole 12b of the second block 122 are skewed, they are shifted in the circumferential direction and partially overlapped in the axial direction.

As shown in FIGS. 3 to 5, the first block 121 and the second block 122 each have a resin groove 14 that communicates with the accommodation hole 12b included in the respective blocks 121 and 122, extends from the axial upper end to lower end, and receives the resin 13. That is, the first block 121 has the plurality of resin grooves 14 that communicate with the respective accommodation holes 12b included in the first block 121 and extend from the axial upper end to lower end. The second block 122 has the plurality of resin grooves 14 that communicate with the respective accommodation holes 12b included in the second block 122 and extend from the axial upper end to lower end. The resin groove 14 is a groove used for injecting the resin 13 melted at the time of manufacturing the rotor 10 into the accommodation hole 12b.

The resin groove 14 of the first block 121 and the resin groove 14 of the second block 122 are at least partially overlapped and connected in the axial direction. According to the present configuration, at the time of manufacturing the rotor 10 having the skewed rotor core 12, it is possible to appropriately inject the resin collectively at a time into the accommodation hole 12b of the magnet 11 included in the respective blocks 121 and 122 in a state where the plurality of blocks 121 and 122 are overlapped in the axial direction. That is, it is possible to improve the manufacturing efficiency of the rotor 10 having the skewed rotor core 12.

In the present preferred embodiment, as shown in FIG. 5, most of the resin groove 14 of the first block 121 and the resin groove 14 of the second block 122 are overlapped and connected in the axial direction. Therefore, in a state where the first block 121 and the second block 122 are overlapped with each other in the axial direction, it is possible to efficiently pour the resin 13 to fill the accommodation hole 12b.

In the present preferred embodiment, as a preferable mode, the first block 121 and the second block 122 have a mark Ma for aligning circumferential positions. When the circumferential positions of the mark Ma provided in the first block 121 and the mark Ma provided in the second block 122 are aligned, the first block 121 and the second block 122 are shifted in the circumferential direction as designed, and are arranged to be correctly skewed.

As a preferable mode, an inner surface of the insertion hole 12a is provided with an insertion hole side protrusion portion 1211 that fits with a shaft side recess portion that is radially recessed and is provided in the shaft 30. The insertion hole side protrusion portion 1211 protrudes radially inward from the inner surface of the insertion hole 12a. The insertion hole side protrusion portion 1211 may be the mark Ma. However, as a configuration in which an insertion hole side recess portion that fits with a shaft side protrusion portion protruding in the radial direction and provided in the shaft 30 is provided on the inner surface of the insertion hole 12a, the insertion hole side recess portion may be configured to be the mark Ma.

That is, the inner surface of the insertion hole 12a may be provided with an insertion hole side protrusion portion or recess portion that fits with a shaft side recess portion that is radially recessed or a shaft side protrusion portion protruding in the radial direction that are provided in the shaft 30, and the mark Ma may be the insertion hole side protrusion portion or recess portion. This makes it possible to use, as the mark Ma, a structure provided in order to prevent relative rotation between the shaft 30 and the rotor core 12, and makes it possible to eliminate the need to specially provide the mark Ma for circumferential alignment.

In the present preferred embodiment, as a preferable mode, the second block 122 is the first block 121 that is vertically inverted in the axial direction in an arrangement where the circumferential positions of the first block 121 and the mark Ma are aligned with each other. The present configuration makes it possible to form, using the same mold, the first block 121 and the second block 122 that constitute the rotor core 12, and makes it possible to reduce the manufacturing cost of the rotor 10.

Figure 6:
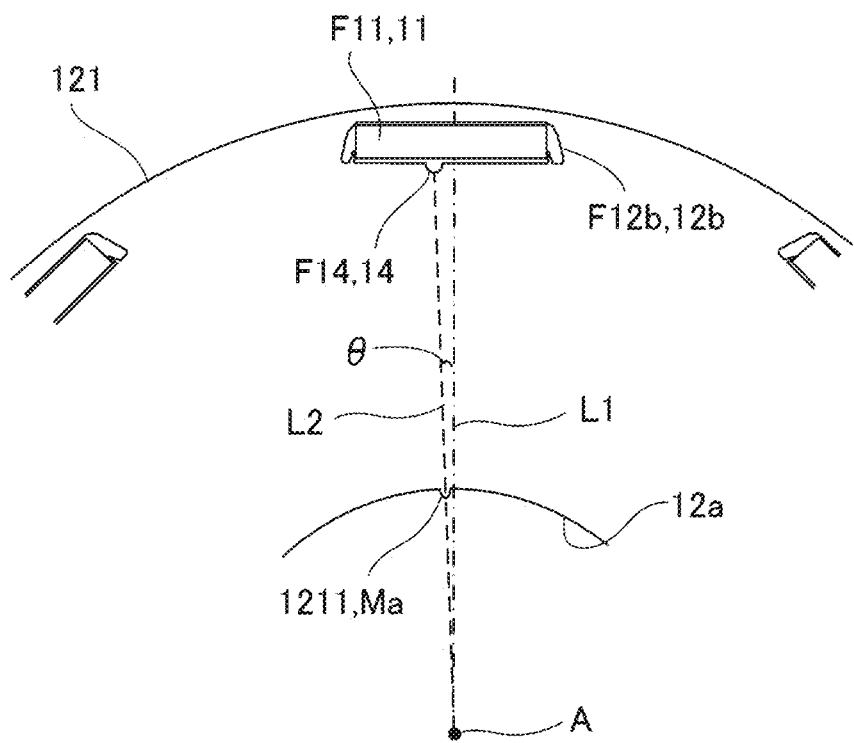
FIG. 6 is an outline bottom view showing, in an enlarged manner, a part of the first block included in the rotor core of the first preferred embodiment.

The point that the first block 121 that is vertically inverted in the axial direction becomes the second block 122 when the circumferential positions of the first block 121 and the mark Ma are aligned with each other will be described in more detail mainly with reference to FIGS. 3, 4, and 6. FIG. 6 is an outline bottom view showing, in an enlarged manner, a part of the first block 121 included in the rotor core 12 of the first preferred embodiment. FIG. 6 is a bottom view focusing on the same accommodation hole 12b as in FIG. 3.

The magnet 11 includes a first magnet F11 extending in a direction parallel to the tangential direction of the rotor core 12. More specifically, the magnet 11 includes only the first magnet F11. The first magnet F11 has a rectangular parallelepiped or substantially rectangular parallelepiped shape. That is, the first magnet F11 has a rectangular shape in plan view from the axial direction.

The accommodation hole 12b includes a first magnet accommodation hole F12b that accommodates the first magnet F11. More specifically, the accommodation hole 12b includes only the first magnet accommodation hole F12b. The first magnet accommodation hole F12b extends in a direction parallel to the tangential direction, similarly to the first magnet F11. The first magnet accommodation hole F12b has a trapezoidal or substantially trapezoidal shape in plan view from the axial direction, and has a longer length in a direction parallel to the tangential direction than the first magnet F11 has.

The resin groove 14 includes a first resin groove F14 that is radially recessed from the inner surface of the first magnet accommodation hole F12b. More specifically, the resin groove 14 includes only the first resin groove F14. In the configuration having the first magnet accommodation hole F12b and the first resin groove F14, a configuration in which the first block 121 is vertically inverted and used as the second block 122 can be formed with a simple structure.

In the present preferred embodiment, as a preferable mode, the first resin groove F14 is disposed radially inward relative to the first magnet F11. According to the present configuration, at the time of injecting the resin 13 into the first magnet accommodation hole F12b, the first magnet F11 can be pressed against the inner surface of radial outward of the first magnet accommodation hole F12b by the flow of the resin 13, and the magnetic characteristics can be improved. In addition, the resin groove 14 for injecting the resin 13 can be provided at a position where the influence on the magnetic characteristics is hardly generated.

Figure 7:
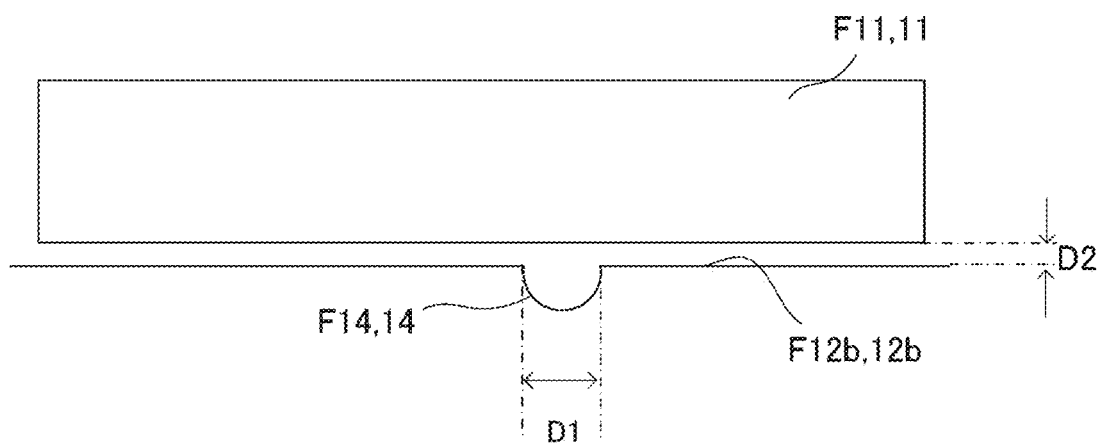
FIG. 7 is a plan view schematically showing a relationship between a first magnet arranged in a first magnet accommodation hole and a first resin groove.

FIG. 7 is a plan view schematically showing the relationship between the first magnet F11 arranged in the first magnet accommodation hole F12b and the first resin groove F14. As shown in FIG. 7, as a preferable mode, in plan view from the axial direction, a maximum width D1 of the first resin groove F14 in a direction parallel to the tangential direction of the rotor core 12 is larger than a shortest distance D2 in the radial direction between the inner surface of radial inward of the first magnet accommodation hole F12b and the first magnet F11. According to the present configuration, at the time of injecting the resin 13 into the first magnet accommodation hole F12b, the resin 13 easily goes up and down the rotor core 12 through the first resin groove F14. Therefore, in each of the blocks 121 and 122, the position of the first magnet F11 accommodated in the first magnet accommodation hole F12b can be arranged at an appropriate position by the flowing resin 13. The shortest distance D2 is preferably about half or less than half of the maximum width D1.

As a preferable mode, the first resin groove F14 is semicircular in plan view from the axial direction. In this case, the maximum width D1 of the first resin groove F14 in a direction parallel to the tangential direction of the rotor core 12 is equal to the diameter of the first resin groove F14. According to the present configuration, it is possible to have a structure in which the injection amount of the resin 13 into the first magnet accommodation hole F12b is easily secured at the time of injecting the resin 13 while minimizing the region where the first resin groove F14 is provided. By minimizing the region where the first resin groove F14 is provided, it is possible to suppress the influence on the magnetic characteristics due to the provision of the first resin groove F14.

As shown in FIGS. 3 and 6, in plan view from the axial direction, the position of the first resin groove F14 is shifted from the center position of the first magnet accommodation hole F12b in the direction parallel to the tangential direction of the rotor core 12. In FIGS. 3 and 6, an alternate long and short dash line L1 is a line connecting the central axis A and the center position of the first magnet accommodation hole F12b in the direction parallel to the tangential direction of the rotor core 12. A broken line L2 is a line connecting the central axis A and a specific point of the first resin groove F14. The specific point is, for example, a point positioned on the radially innermost of the first resin groove F14. Note that the mark Ma (insertion hole side protrusion portion 1211) provided for circumferential alignment is provided at a position through which the broken line L2 passes.

Since the position of the first resin groove F14 and the mark Ma are shifted from the center position of the first magnet accommodation hole F12b as described above, in FIG. 3 where the first block 121 is viewed in plan view from above, the broken line L2 is shifted by θ degrees in the clockwise direction with respect to the alternate long and short dash line L1. In FIG. 6 where the first block 121 is viewed in plan view from below, the broken line L2 is shifted by θ degrees in the counterclockwise direction with respect to the alternate long and short dash line L1.

Therefore, in order to overlap the first block 121 that is vertically inverted in the axial direction on the first block 121 and align the circumferential position of the mark Ma, the first block 121 is rotated by 2θ degrees in the clockwise direction. Then, as shown in FIG. 5, the first block 121 and the second block 122 are arranged such that the circumferential positions of the respectively provided first resin grooves F14 are aligned and skewed. That is, by arranging the position of the first resin groove F14 to be shifted from the center position of the first magnet accommodation hole F12b, it is possible to obtain a configuration in which the second block 122 is provided by vertically inverting the first block 121, and it is possible to reduce the manufacturing cost.

Figure 8:
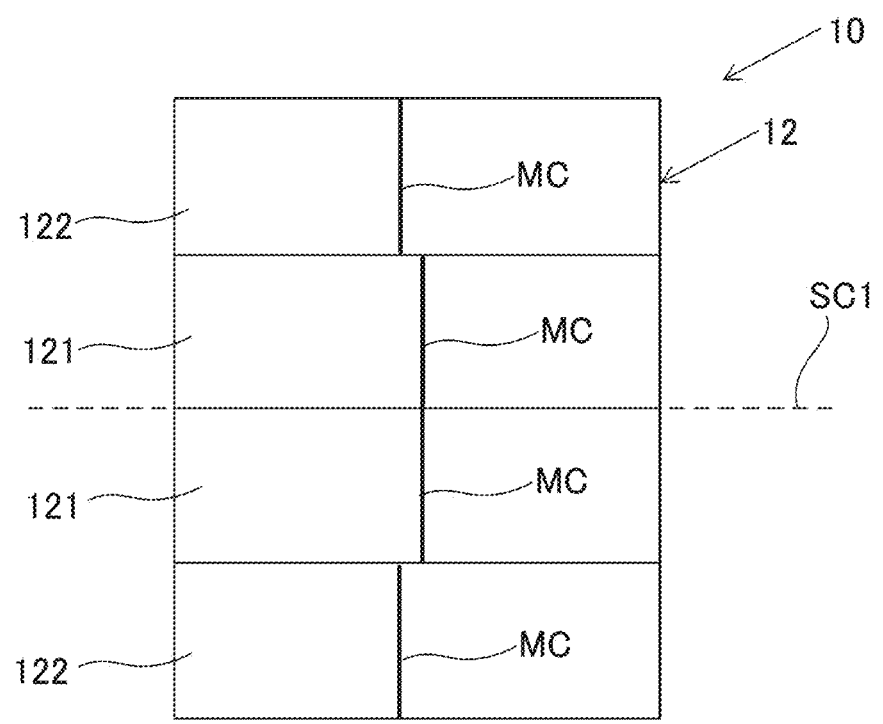
FIG. 8 is a side view schematically showing the rotor of the first preferred embodiment.

FIG. 8 is a side view schematically showing the rotor 10 of the first preferred embodiment. In FIG. 8, a thick line MC indicates the center position of the magnetic pole of each of the blocks 121 and 122 when a certain magnetic pole of the rotor 10 is focused on. As shown in FIGS. 2 and 8, in the present preferred embodiment, the first block 121 and the second block 122 are arranged side by side in contact with each other in the axial direction. Such a configuration makes it possible to manufacture the skewed rotor core 12 having three or four blocks, for example, at low cost. In the present preferred embodiment, the number of blocks constituting the rotor core 12 is four.

In the present preferred embodiment, as shown in FIG. 8, a block set in which the first block 121 and the second block 122 are arranged side by side in contact with each other in the axial direction is arranged line-symmetrically with respect to a bisecting plane SC1 that bisects the rotor core 12 in the axial direction. In the present preferred embodiment, when manufacturing the skewed rotor core 12 having four blocks, it is possible to set the number of molds for forming the blocks to one, and it is possible to manufacture the rotor 10 at low cost.

In the present preferred embodiment, the first resin groove F14 provided in each of the four blocks constituting the rotor core 12 overlaps and communicates with each other in the axial direction. That is, it is possible to appropriately inject a resin 13A collectively at a time into the first magnet accommodation hole F12b included in each block in a state where the four blocks are overlapped in the axial direction.

As shown in FIGS. 3 and 4, each of the first block 121 and the second block 122 has, on the inner surface of the accommodation hole 12b, a positioning protrusion portion 15 that determines the longitudinal position of the magnet 11 in plan view from the axial direction. More specifically, a pair of positioning protrusion portions 15 protruding radially outward are provided on the surface of radially inward of the first magnet accommodation hole F12b. In plan view from the axial direction, the pair of positioning protrusion portions 15 come into contact with both longitudinal ends of the first magnet F11, and suppress the movement of the first magnet F11 to the longitudinal direction. That is, it is possible to arrange the first magnet F11 at an appropriate position.

As a preferable mode, in the axial direction of the accommodation hole 12b of each of the blocks 121 and 122, the presence region of the positioning protrusion portion 15 is smaller than the absence region of the positioning protrusion portion 15. According to the present configuration, it is possible to minimize the formation range of the positioning protrusion portion 15 in each of the blocks 121 and 122, and make it difficult for the flow of the resin 13 to be hindered at the time of injecting the resin 13 into the accommodation hole 12b, while forming the positioning protrusion portion 15 on the inner surface of the accommodation hole 12b to determine the position of the magnet 11.

Figure 9A:
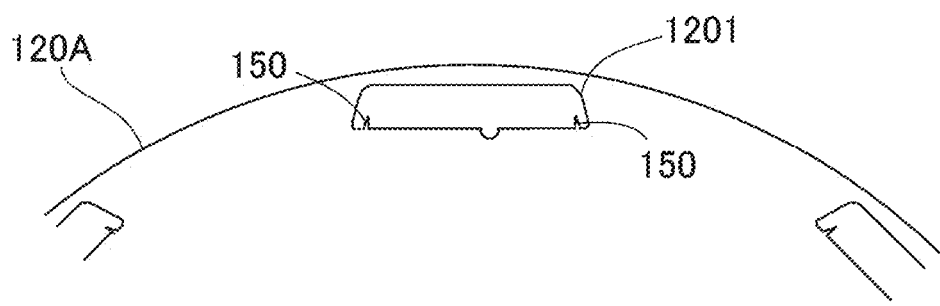
FIG. 9A is a plan view schematically showing a configuration of a first preferred magnetic steel plate.
Figure 9B:
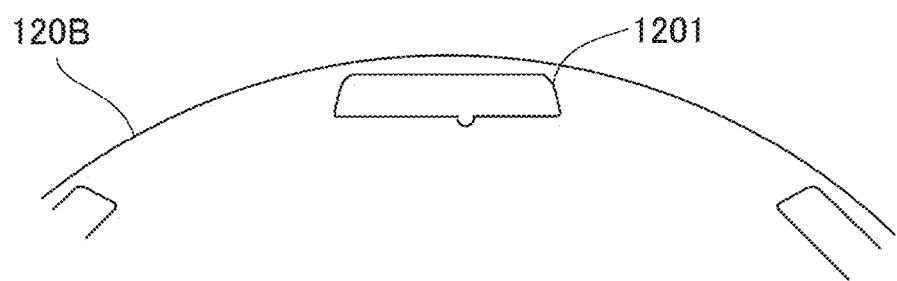
FIG. 9B is a plan view schematically showing a configuration of a second preferred magnetic steel plate.

In order to achieve such a configuration, for example, a first magnetic steel plate 120A and a second magnetic steel plate 120B may be used as a plurality of magnetic steel plates constituting the blocks 121 and 122, respectively. FIG. 9A is a plan view schematically showing the configuration of the first magnetic steel plate 120A. FIG. 9B is a plan view schematically showing the configuration of the second magnetic steel plate 120B.

As shown in FIG. 9A, in the first magnetic steel plate 120A, a protrusion portion 150 constituting the positioning protrusion portion 15 is formed in an accommodation hole constitution portion 1201 constituting the accommodation hole 12b in which the magnet 11 is accommodated. On the other hand, as shown in FIG. 9B, in the second magnetic steel plate 120B, the protrusion portion 150 constituting the positioning protrusion portion 15 is not provided in the accommodation hole constitution portion 1201 constituting the accommodation hole 12b in which the magnet 11 is accommodated.

Figure 10:
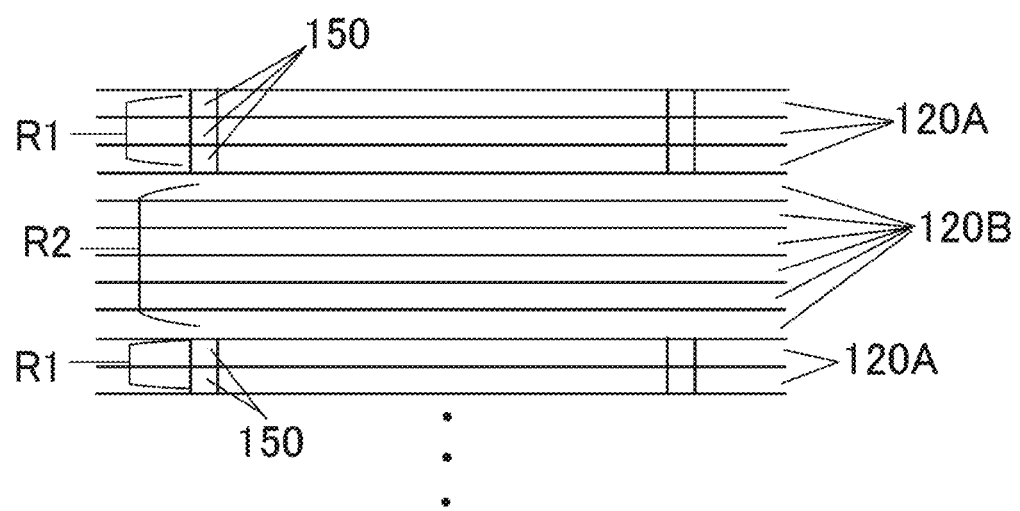
FIG. 10 is a view schematically showing a lamination image of a magnetic steel plate of a block including the first magnetic steel plate and the second magnetic steel plate.

FIG. 10 is a view schematically showing a lamination image of the magnetic steel plate of the blocks 121 and 122 including the first magnetic steel plate 120A and the second magnetic steel plate 120B. As shown in FIG. 10, in the axial direction, the portion where the protrusion portion 150 is positioned is a presence region R1 of the positioning protrusion portion 15, and a portion where the protrusion portion 150 is not present is an absence region R2 of the positioning protrusion portion 15. In each of the blocks 121 and 122, the number of laminated second magnetic steel plates 120B is made larger than the number of laminated first magnetic steel plates 120A. Thus, in the axial direction of the accommodation hole 12b of each of the blocks 121 and 122, the presence region R1 of the positioning protrusion portion 15 can be configured to be smaller than the absence region R2 of the positioning protrusion portion 15.

Next, a rotor 10A according to the second preferred embodiment will be described. In the description of the second preferred embodiment, description of contents redundant with the first preferred embodiment will be omitted as much as possible.

Figure 11:
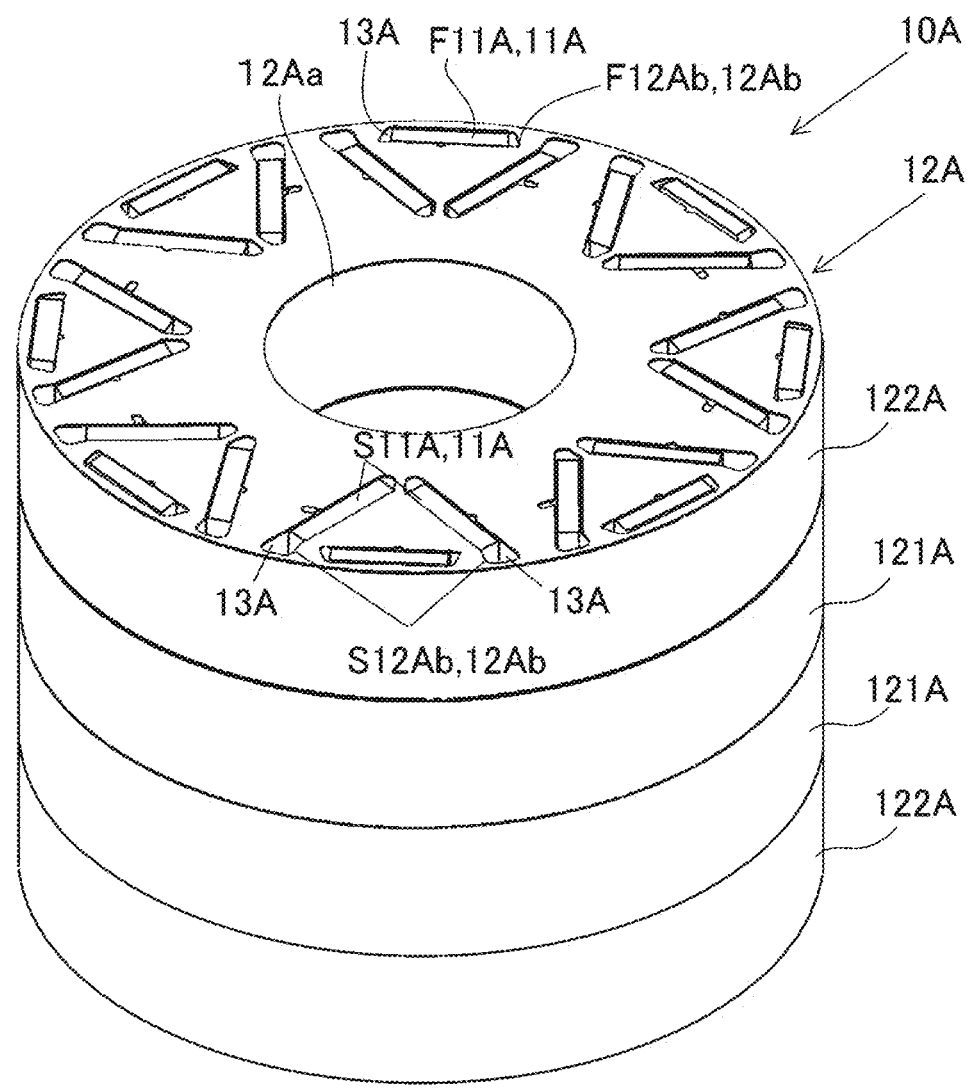
FIG. 11 is a perspective view showing an outline configuration of a rotor of a second embodiment.

FIG. 11 is a perspective view showing an outline configuration of a rotor 10A of the second preferred embodiment. As shown in FIG. 11, similarly to the first preferred embodiment, the rotor 10A of the second preferred embodiment includes a magnet 11A constituting each magnetic pole, a rotor core 12A having an accommodation hole 12Ab for accommodating the magnet 11A, and a resin 13A that is put into the accommodation hole accommodation hole 12Ab.

Also in the second preferred embodiment, similarly to the first preferred embodiment, the number of magnetic poles of the rotor 10A is 8, and the rotor 10A includes the magnet 11A constituting each of the eight magnetic poles. In the present preferred embodiment, the magnet 11A further includes a pair of second magnets S11A that form a V-shape as a pair in plan view from the axial direction. That is, the magnet 11A constituting each magnetic pole includes a first magnet F11A and the pair of second magnets S11A.

Since the first magnet F11A has the same configuration as that of the first magnet F11 of the first preferred embodiment, the description thereof will be omitted here. The pair of second magnets S11A are arranged line-symmetrically with respect to a line extending in the radial direction from the central axis A. The pair of second magnets S11A are arranged such that the circumferential interval between the both decreases radially inward. At least a part of the first magnet F11A is disposed radially outward relative to the pair of second magnets S11A. The magnet 11A has a so-called V type arrangement. Each of the second magnets S11A has a rectangular parallelepiped or rectangular parallelepiped shape, and has a rectangular or substantially rectangular shape in plan view from the axial direction.

Also in the second preferred embodiment, the rotor core 12A is cylindrical about the central axis A, and has, at the central portion, an insertion hole 12Aa through which the shaft 30 (see FIG. 1) is inserted. The rotor core 12A includes a first block 121A and a second block 122A that is arrayed in the axial direction together with the first block 121A and arranged with the position of the accommodation hole 12Ab shifted with respect to the first block 121A. That is, the first block 121A and the second block 122A have a skewed configuration.

Also in the second preferred embodiment, the first block 121A that is vertically inverted in the axial direction becomes the second block 122A when the circumferential positions of the first block 121A and the mark Ma are aligned with each other. Similarly to the first preferred embodiment (see FIG. 8), a block set in which the first block 121A and the second block 122A are arranged side by side in contact with each other in the axial direction is arranged line-symmetrically with respect to the bisecting plane SC1 that bisects the rotor core 12A in the axial direction.

Figure 12:
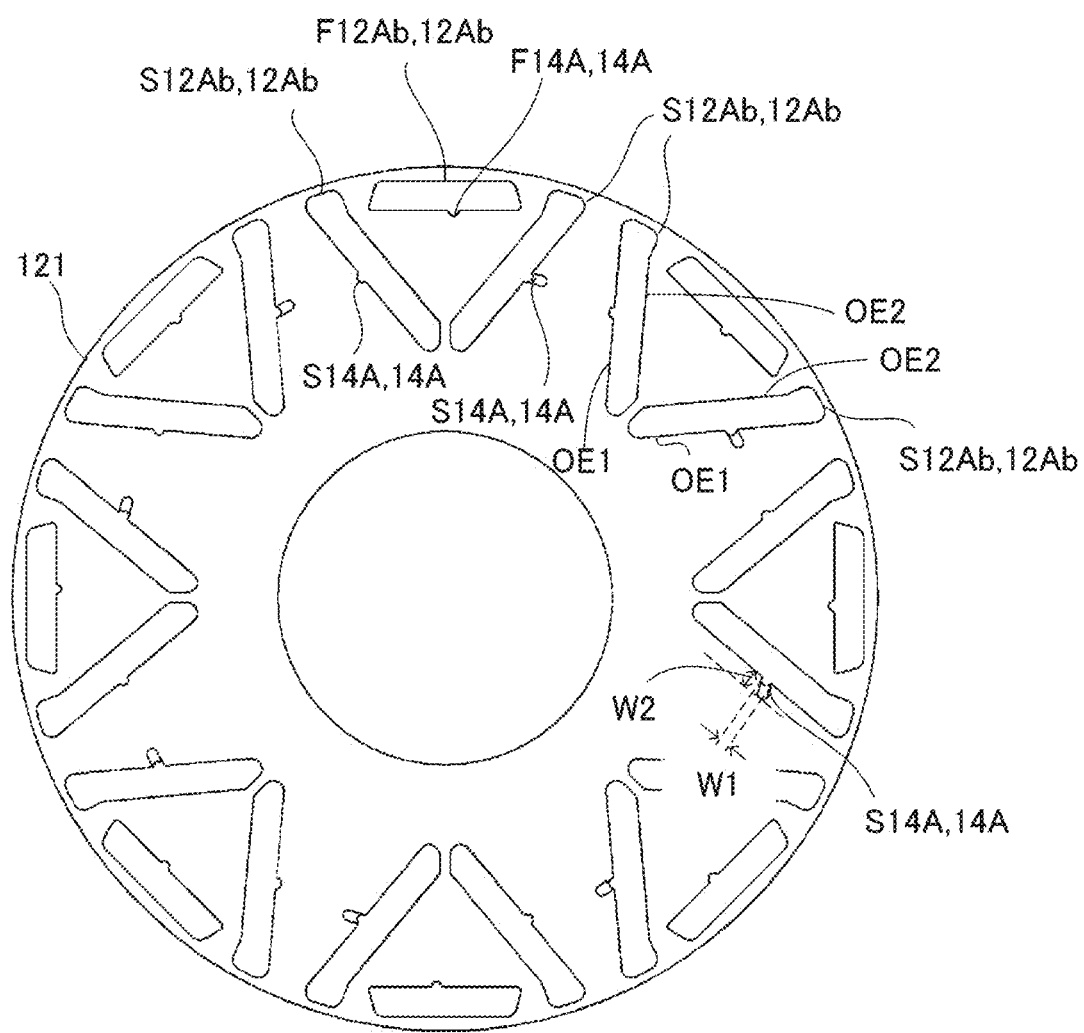
FIG. 12 is an outline plan view showing a configuration of a first block included in a rotor core of the second preferred embodiment.

FIG. 12 is an outline plan view showing the configuration of the first block 121A included in the rotor core 12A of the second preferred embodiment. Since the second block 122A is obtained by vertically inverting the first block 121A, description of the detailed configuration will be omitted. As shown in FIG. 12, the accommodation hole 12Ab further includes a pair of second magnet accommodation holes S12Ab that accommodate the pair of second magnets S11A. That is, the accommodation hole 12Ab includes a first magnet accommodation hole F12Ab and the pair of second magnet accommodation holes S12Ab.

Since the first magnet accommodation hole F12Ab has the same configuration as that of the first magnet accommodation hole F12b of the first preferred embodiment, the description thereof will be omitted here. The pair of second magnet accommodation holes S12Ab form a V-shape as a pair in plan view from the axial direction. More specifically, the pair of second magnet accommodation holes S12Ab are arranged such that the circumferential interval between the both decreases radially inward. In plan view from the axial direction, each of the second magnet accommodation holes S12Ab is longer in length than the second magnet S11A in a direction parallel to the longitudinal direction of the second magnet S11A to be accommodated. Similarly to the first magnet accommodation hole F12Ab, each of the second magnet accommodation holes S12Ab is preferably provided with a positioning protrusion portion that determines the longitudinal position of the second magnet S11A.

The first block 121A has a resin groove 14A that communicates with the accommodation hole 12Ab, extends from the axial upper end to lower end, and receives the resin 13A. The resin groove 14A further includes a second resin groove S14A that is circumferentially recessed from the inner surface of each of the pair of second magnet accommodation holes S12Ab. That is, the resin groove 14A includes a first resin groove F14A and the second resin groove S14A. Since the first resin groove F14A has the same configuration as that of the first resin groove F14 of the first preferred embodiment, the description thereof will be omitted here. The second resin groove S14A extends from the upper end to the lower end of the first block 121A. Details of the second resin groove S14A will be described later.

Similarly to the first preferred embodiment, the first resin groove F14A of the first block 121A and the first resin groove F14A of the second block 122A can be configured such that at least a part thereof overlaps and communicates with each other in the axial direction. In addition, the second resin groove S14A of the first block 121A and the second resin groove S14A of the second block 122A can also be configured such that at least a part thereof overlaps and communicates with each other in the axial direction. Therefore, even when the magnet 11A constituting each magnetic pole includes a plurality of V type magnets, the resin can be appropriately injected at a time into the accommodation hole 12Ab of the magnet 11A of each of the blocks 121A and 122A, in a state where the plurality of blocks 121A and 122A are overlapped in the axial direction.

As shown in FIG. 12, the outer edge of the second magnet accommodation hole S12Ab has a first outer edge portion OE1 and a second outer edge portion OE2 facing each other in the lateral direction of the second magnet S11A in plan view from the axial direction. In the present preferred embodiment, the outer edge of the second magnet accommodation hole S12Ab has a rectangular or substantially rectangular shape. The first outer edge portion OE1 and the second outer edge portion OE2 are linear.

The first outer edge portion OE1 is disposed radially inward relative to the second outer edge portion OE2. The second resin groove S14A is provided on an inner surface axially extending from the first outer edge portion OE1. The second resin groove S14A is recessed with respect to the inner surface axially extending from the first outer edge portion OE1, and extends from the upper end to the axial lower end. According to the present configuration, at the time of injecting the resin 13A into the second magnet accommodation hole S12Ab, the second magnet S11A can be pressed against the inner surface axially extending from the second outer edge portion OE2 by the flow of the resin 13A. That is, according to the present configuration, the second magnet S11A can be pressed against the inner surface of radial outward of the second magnet accommodation hole S12Ab, and the magnetic characteristics can be improved.

In the present preferred embodiment, the second resin groove S14A is provided in a central portion of the first outer edge portion OE1 in a direction parallel to the longitudinal direction of the second magnet S11A in plan view from the axial direction. However, the position where the second resin groove S14A is provided may be a position shifted from the central portion described above. The pair of second magnet accommodation holes S12Ab are arranged line-symmetrically with respect to a line extending in the radial direction from the central axis A in plan view from the axial direction. For this reason, the circumferential orientations in which the second resin groove S14A is recessed from the inner surface of the second magnet accommodation hole S12Ab are opposite to each other in one and the other of the pair of second magnet accommodation holes S12Ab.

Similarly to the pair of second magnet accommodation holes S12Ab, the second resin groove S14A provided in each of the pair of second magnet accommodation holes S12Ab may be line-symmetric in plan view from the axial direction, but needs not to be line-symmetric. In the present preferred embodiment, the configuration is not line-symmetric. The second resin groove S14A may be provided not on the inner surface axially extending from the first outer edge portion OE1 but on the inner surface axially extending from the second outer edge portion OE2.

The second resin groove S14A provided in the first block 121A will be described in more detail. In plan view from the axial direction, a length W2 of the second resin groove S14A in a direction orthogonal to a longitudinal direction of the second magnet S11A is preferably longer than a width W1 of the second resin groove S14A in a direction parallel to the longitudinal direction of the second magnet S11A at least at either the upper end or the lower end in the axial direction (see FIG. 12). With the configuration in which the second resin groove S14A extends long in the circumferential direction as described above, it is possible to easily communicate with the second resin groove S14A of another block that is skewed and overlapped in the axial direction, and it is possible to appropriately inject the resin at a time in a state where the blocks are overlapped.

The second resin groove S14A provided in the first block 121A may be configured to extend long in the circumferential direction from the upper end to the axial lower end as described above. However, the present preferred embodiment is not configured to extend long in the circumferential direction from the upper end to the lower end. This will be described below.

The rotor core 12A includes magnetic steel plates laminated in the axial direction. That is, the first block 121A and the second block 122A include magnetic steel plates laminated in the axial direction. In the first block 121A and the second block 122A, end portion magnetic steel plates 120C that are the magnetic steel plates at the axial upper end and lower end and an intermediate magnetic steel plate 120D that is the magnetic steel plate disposed in the axial direction between the end portion magnetic steel plates 120C at the axial upper end and lower end are different in the shape of a groove portion 140 (see FIG. 13A described later and the like) constituting the second resin groove S14A.

In the present preferred embodiment, the number of intermediate magnetic steel plates 120D is plural. Hereinafter, the end portion magnetic steel plate 120C at the axial upper end is sometimes referred to as an upper end portion magnetic steel plate 120CU. The end portion magnetic steel plate 120C at the axially lower end is sometimes referred to as a lower end portion magnetic steel plate 120CL.

Figure 13A:
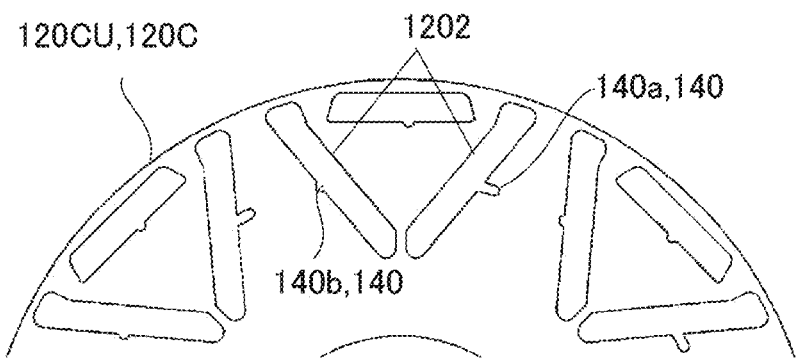
FIG. 13A is an outline plan view showing a configuration of a part of an upper end portion magnetic steel plate.
Figure 13B:
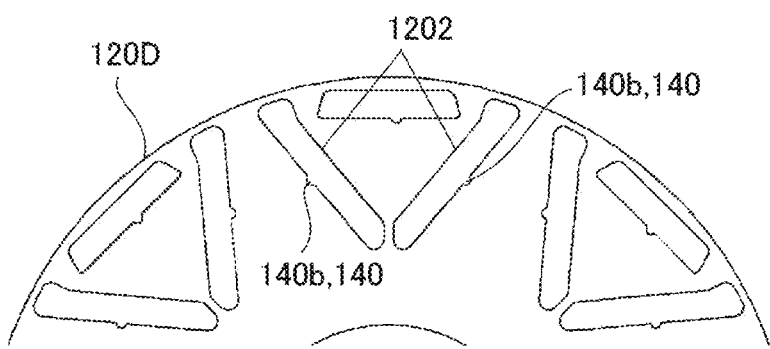
FIG. 13B is an outline plan view showing a configuration of a part of a lower end portion magnetic steel plate.
Figure 13C:
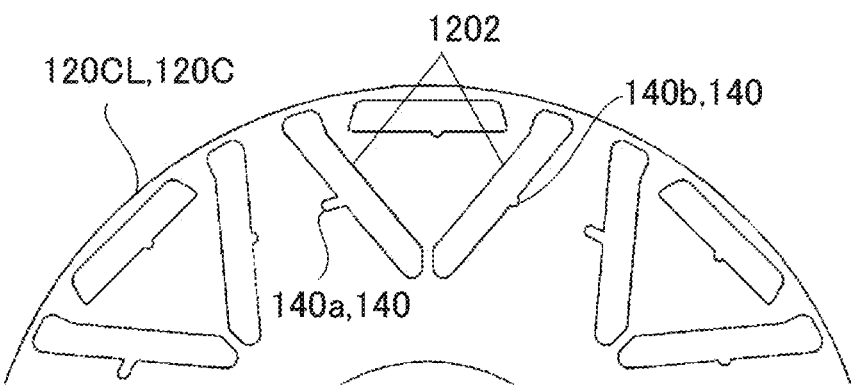
FIG. 13C is an outline plan view showing a configuration of a part of an intermediate magnetic steel plate.

FIG. 13A is an outline plan view showing the configuration of a part of the upper end portion magnetic steel plate 120CU. FIG. 13B is an outline plan view showing the configuration of a part of the lower end portion magnetic steel plate 120CL. FIG. 13C is an outline plan view showing the configuration of a part of an intermediate magnetic steel plate 120D. In FIGS. 13A to 13C, a reference numeral 1202 denotes a second magnet accommodation hole constitution portion that constitutes the second magnet accommodation hole S12Ab formed by lamination of magnetic steel plates.

As shown in FIG. 13A, in the upper end portion magnetic steel plate 120CU, the groove portion 140 provided in one of a pair of second magnet accommodation hole constitution portions 1202 is a long groove portion 140a extending long in the circumferential direction. The length W2 of the long groove portion 140a in a direction orthogonal to a longitudinal direction of the second magnet S11A is longer than the width W1 of the long groove portion 140a in a direction parallel to the longitudinal direction of the second magnet S11A accommodated in the second magnet accommodation hole S12Ab. The width W1 and the length W2 are defined similarly to the case of FIG. 12.

On the other hand, in the upper end portion magnetic steel plate 120CU, the groove portion 140 provided in the other of the pair of second magnet accommodation hole constitution portions 1202 is a short groove portion 140b. In the short groove portion 140b, the width W1 in a direction parallel to the longitudinal direction of the second magnet S11A accommodated in the second magnet accommodation hole S12Ab is equal to the length W2 in a direction orthogonal thereto. In the present preferred embodiment, the short groove portion 140b has a semicircular or substantially semicircular shape in plan view from the axial direction. In the upper end portion magnetic steel plate 120CU, the long groove portion 140a provided in one of the pair of second magnet accommodation hole constitution portions 1202 and the short groove portion 140b provided in the other are arranged at an interval in the circumferential direction.

As shown in FIG. 13B, in the intermediate magnetic steel plate 120D, the short groove portion 140b is provided in each of the pair of second magnet accommodation hole constitution portions 1202. The two short groove portions 140b are arranged at an interval in the circumferential direction. The short groove portion 140b provided in the intermediate magnetic steel plate 120D and the short groove portion 140b provided in the upper end portion magnetic steel plate 120CU have the same shape and size. The radial position where the short groove portion 140b provided in the intermediate magnetic steel plate 120D is provided is the same as the radial positions of the long groove portion 140a and the short groove portion 140b provided in the upper end portion magnetic steel plate 120CU. That is, the short groove portion 140b provided in the intermediate magnetic steel plate 120D and the long groove portion 140a and the short groove portion 140b provided in the upper end portion magnetic steel plate 120CU overlap each other in the axial direction.

As shown in FIG. 13C, in the lower end portion magnetic steel plate 120CL, the groove portion 140 provided in one of the pair of second magnet accommodation hole constitution portions 1202 is the short groove portion 140b. The groove portion 140 provided in the other of the pair of second magnet accommodation hole constitution portions 1202 is the long groove portion 140a. That is, in the lower end portion magnetic steel plate 120CL and the upper end portion magnetic steel plate 120CU, the configurations of the groove portions 140 provided in one and the other of the pair of second magnet accommodation hole constitution portions 1202 are reversed. The configurations of the long groove portion 140a and the short groove portion 140b provided in the lower end portion magnetic steel plate 120CL are similar to those of the upper end portion magnetic steel plate 120CU except that which of one and the other of the pair of second magnet accommodation hole constitution portions 1202 to be provided is reversed.

When the first block 121A is configured by arranging the upper end portion magnetic steel plate 120CU, the plurality of intermediate magnetic steel plates 120D laminated in the axial direction, and the lower end portion magnetic steel plate 120CL in this order from the top to the bottom, at least a part of the groove portion 140 provided in each magnetic steel plate is arranged in the axial direction. The second resin groove S14A extends from the upper end to the lower end of the first block 121A.

As seen from the above description, in the present preferred embodiment, the end portion magnetic steel plate 120C has the groove portion 140 extending longer in the circumferential direction than the groove portion 140 of the intermediate magnetic steel plate 120D. This configuration makes it possible to secure communication with the second resin groove S14A of another block overlapped in the axial direction having been skewed, and makes it possible to minimize the region where the second resin groove S14A is provided in the block. That is, according to the present configuration, it is possible to facilitate the work of injecting the resin 13A into the second magnet accommodation hole S12Ab in the skewed rotor core 12A, and it is possible to suppress the influence on the magnetic characteristics due to the provision of the second resin groove S14A.

The upper end portion magnetic steel plate 120CU and the lower end portion magnetic steel plate 120CL may have the same configuration of the groove portion 140 provided in the pair of second magnet accommodation hole constitution portions 1202. That is, in the upper end portion magnetic steel plate 120CU and the lower end portion magnetic steel plate 120CL, both of the groove portions 140 provided in the pair of second magnet accommodation hole constitution portions 1202 may be the long groove portion 140a.

Figure 14:
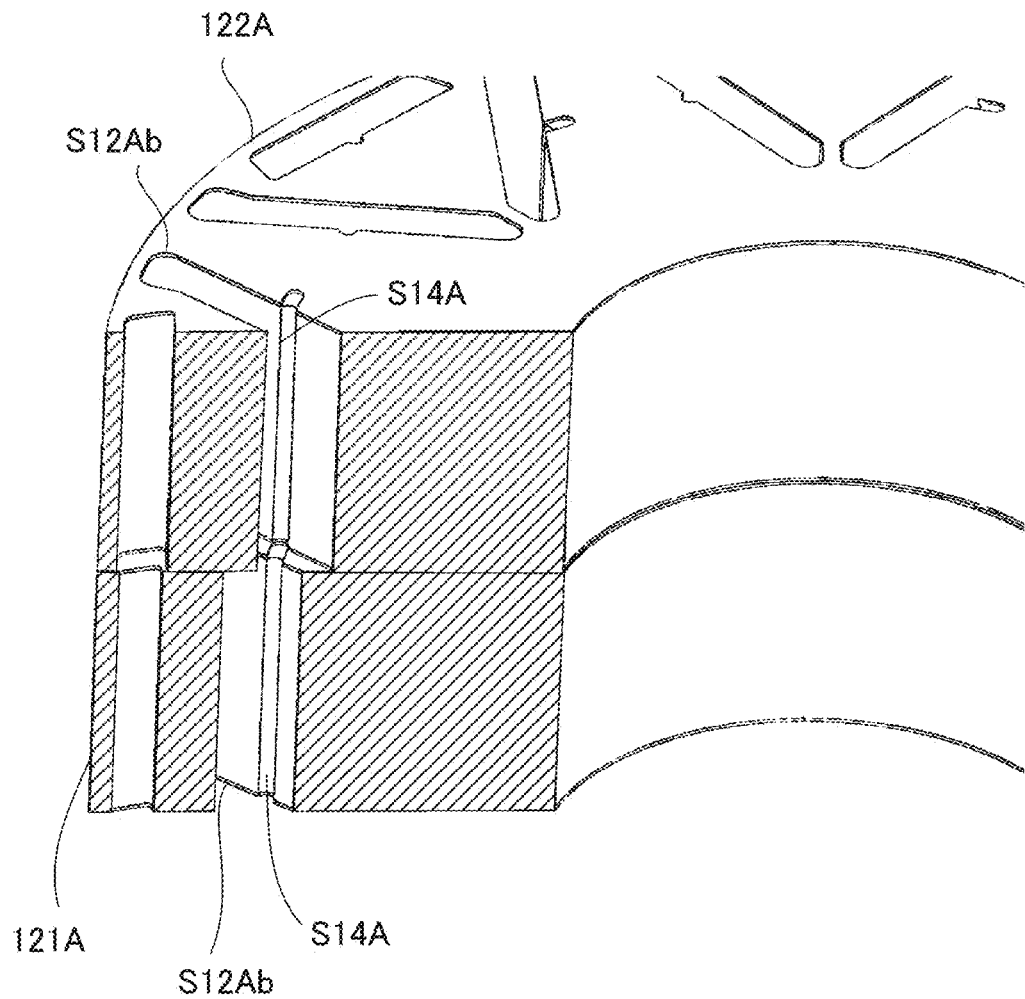
FIG. 14 is a view showing an outline configuration of a cross section of a part of a block set in which the first block and a second block included in the rotor core of the second preferred embodiment are overlapped in an axial direction.

FIG. 14 is a view showing an outline configuration of a cross section of a part of a block set in which the first block 121A and the second block 122A included in the rotor core 12A of the second preferred embodiment are overlapped in the axial direction. As shown in FIG. 14, the second resin groove S14A of the first block 121A and the second resin groove S14A of the second block 122A partially overlap and communicate with each other in the axial direction.

Also in the present preferred embodiment, the rotor core 12A has a configuration in which a block set in which the first block 121A and the second block 122A are arranged side by side in contact with each other in the axial direction is arranged line-symmetrically with respect to the bisecting plane SC1 that bisects the rotor core 12A in the axial direction (see FIG. 8). For this reason, the second resin groove S14A provided in each of the four blocks also partially overlaps and communicates in the axial direction. That is, it is possible to appropriately inject a resin 13A collectively at a time into the second magnet accommodation hole S12Ab included in each block in a state where the four blocks are overlapped in the axial direction.

Hereinafter, modifications of the rotors 10 and 10A will be described.

In the configuration of the second preferred embodiment, the first magnet F11A and the first magnet accommodation hole F12Ab need not to be provided. For example, instead of the first magnet F11A and the first magnet accommodation hole F12Ab, a magnet and a magnet accommodation hole having the same configuration as that of the pair of second magnets S11A and the pair of second magnet accommodation holes S12Ab may be arranged. That is, the technology of the present disclosure can be widely applied to a configuration in which a pair of second magnets forming a V-shape is included in a magnet forming each magnetic pole.

In the configuration of the second preferred embodiment, instead of the pair of second magnets S11A and the pair of second magnet accommodation holes S12Ab, a magnet and a magnet accommodation hole having the same configuration as that of the first magnet F11A and the first magnet accommodation hole F12Ab may be arranged.

A case where the number of blocks constituting the rotor cores 12 and 12A is 4 has been described above. However, the number of blocks including the first blocks 121 and 121A and the second blocks 122 and 122A may be 3 or 5 or more.

The rotor core may be configured to have at least one block disposed between the first blocks 121 and 121A and the second blocks 122 and 122A in the axial direction, and the position of the magnetic pole of the rotor core may be line-symmetric with respect to a bisecting plane that bisects the rotor core in the axial direction. Also with such a configuration, the resin grooves 14 and 14A of the first blocks 121 and 121A and the resin grooves 14 and 14A of the second blocks 122 and 122A are at least partially overlapped and connected in the axial direction, or are connected via a resin groove included in at least one other block disposed between the first blocks 121 and 121A and the second blocks 122 and 122A in the axial direction. That is, according to the present configuration, it is possible to manufacture, at low cost, a rotor having a rotor core in which, for example, five, six, or eight blocks are skewed and arranged side by side.

Figure 15:
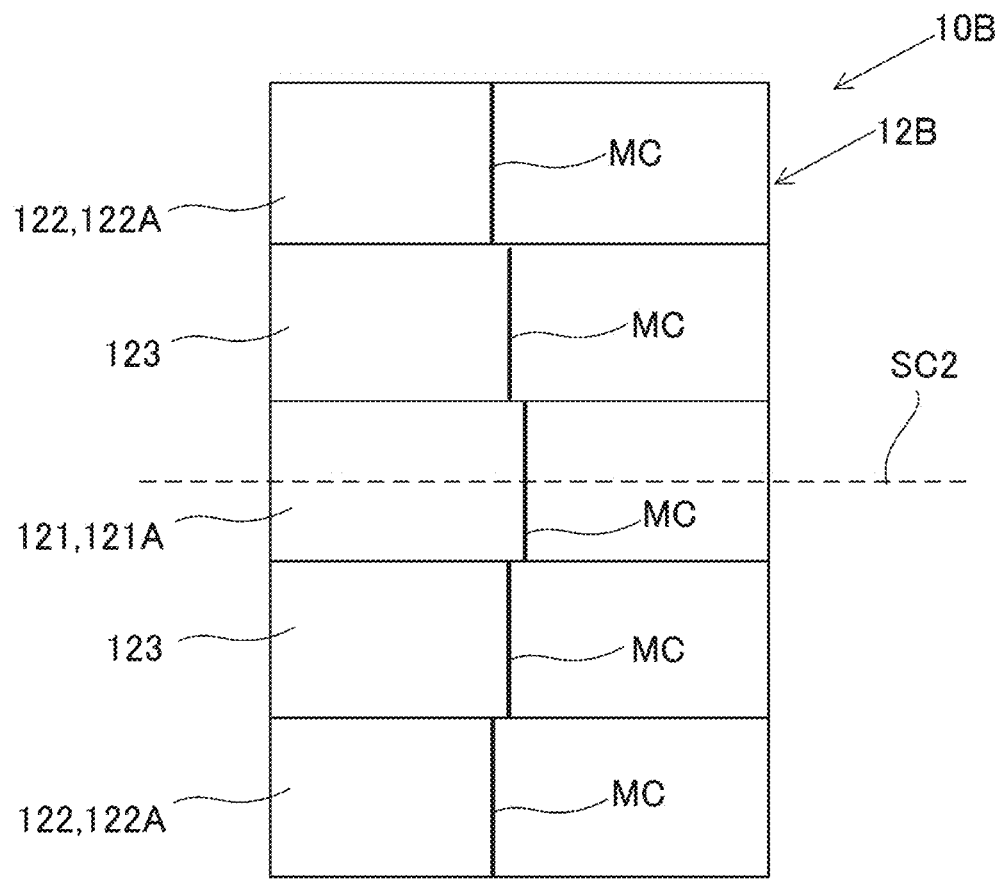
FIG. 15 is a view showing a configuration example of a rotor in which a rotor core includes five blocks including a first block and a second block.

FIG. 15 is a view showing a configuration example of a rotor 10B in which a rotor core 12B includes five blocks including the first blocks 121 and 121A and the second blocks 122 and 122A. In FIG. 15, the thick line MC indicates the center position of the magnetic pole of each block when a certain magnetic pole of the rotor 10B is focused on.

In the example shown in FIG. 15, the first blocks 121 and 121A are arranged at the center position in the axial direction. A third block 123 and the second blocks 122 and 122A are arranged in order from the bottom on the first blocks 121 and 121A arranged at the center. The third block 123 and the second blocks 122 and 122A are arranged in order from the top underneath the first blocks 121 and 121A arranged at the center. The positions of the magnetic poles of the rotor core 12B are arranged line-symmetrically with respect to a bisecting plane SC2 that bisects the rotor core 12B in the axial direction.

The third block 123 has a configuration different from that of the first blocks 121 and 121A and the second blocks 122 and 122A. For example, when the first block and the second block are the first block 121 and the second block 122 of the first preferred embodiment, the position of the first resin groove F14 provided in the third block 123 may be the center position of the first magnet accommodation hole F12b in plan view from the axial direction. With such a configuration, in the rotor core 12B having a skewed structure, at least a part of the resin grooves of the five blocks overlap in the axial direction.

Figure 16:
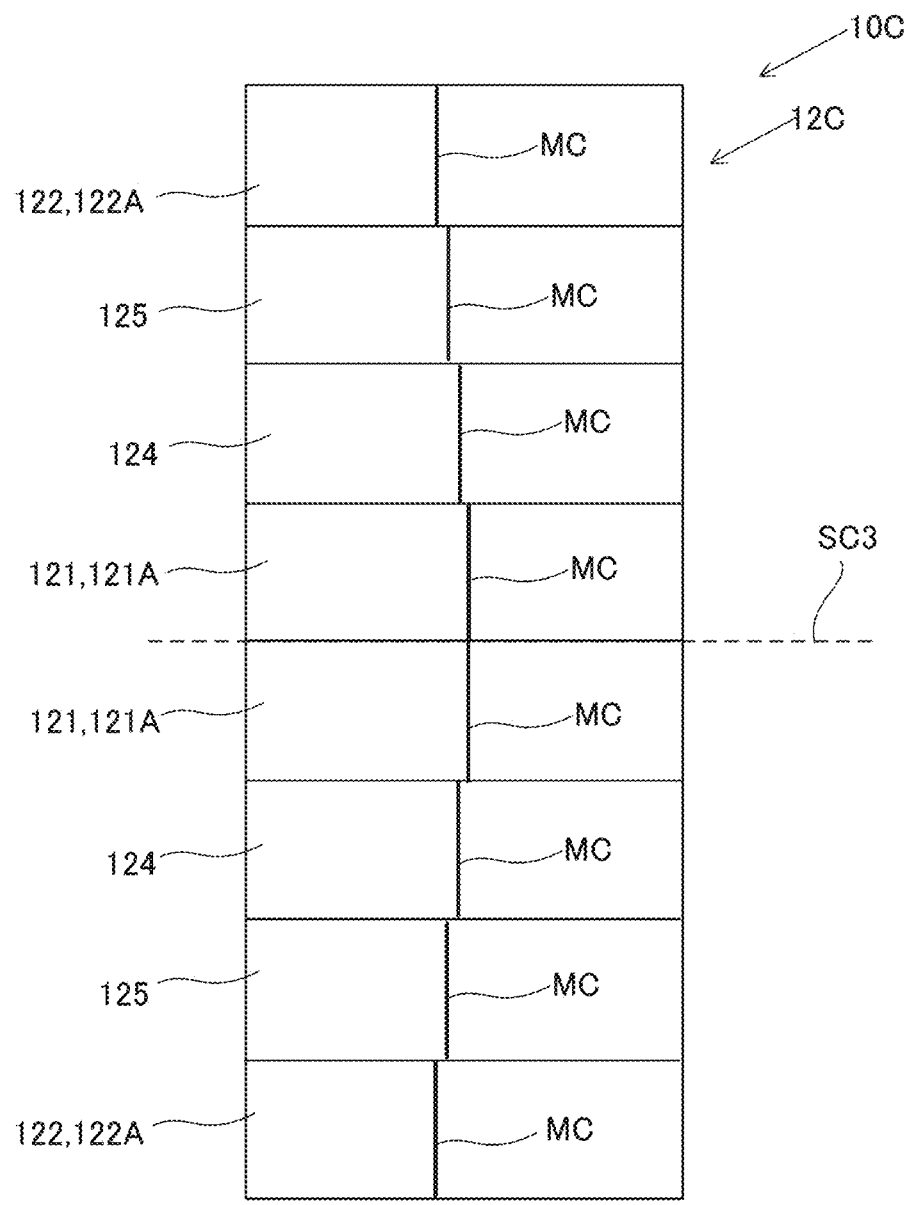
FIG. 16 is a view showing a configuration example of a rotor in which a rotor core includes eight blocks including a first block and a second block.

FIG. 16 is a view showing a configuration example of a rotor 10C in which a rotor core 12C includes eight blocks including the first blocks 121 and 121A and the second blocks 122 and 122A. In FIG. 16, the thick line MC indicates the center position of the magnetic pole of each block when a certain magnetic pole of the rotor 10C is focused on.

In the example shown in FIG. 16, a block set in which the first blocks 121 and 121A, a fourth block 124, a fifth block 125, and the second blocks 122 and 122A are arranged in this order from the bottom is arranged line-symmetrically with respect to a bisecting plane SC3 that bisects the rotor core 12C in the axial direction. Also in this case, the positions of the magnetic poles of the rotor core 12C are arranged line-symmetrically with respect to a bisecting plane SC3 that bisects the rotor core 12C in the axial direction.

The fourth block 124 and the fifth block 125 have configurations different from that of the first blocks 121 and 121A and the second blocks 122 and 122A. In this configuration, similarly to the first blocks 121 and 121A and the second blocks 122 and 122A, the fourth block 124 and the fifth block 125 may be shared by being vertically inverted.

Various technical features disclosed in the present description can be variously modified in a scope without departing from the gist of the technical creation. The plurality of preferred embodiments and modifications shown in the present description may be carried out in combination as far as possible.

The technology of the present disclosure can be used for, for example, home appliances, automobiles, ships, aircraft, trains, power-assisted bicycles, wind power generators, and the like.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor that is used in an inner rotor type rotating electrical machine and has a plurality of magnetic poles in a circumferential direction about a central axis extending vertically, the rotor comprising:
    a magnet that constitutes each of the magnetic poles;
    a rotor core that has an axially extending accommodation hole for accommodating the magnet; and
    a resin that is put into the accommodation hole, wherein
    the rotor core includes
    a first block, and
    a second block that is arrayed in an axial direction together with the first block and is arranged such that a circumferential position of the accommodation hole is shifted with respect to the first block,
    the first block and the second block each have a resin groove that communicates with the accommodation hole included in each block, extends from an axial upper end to lower end, and receives the resin, and
    the resin groove of the first block and the resin groove of the second block are at least partially overlapped and connected in an axial direction, or are connected via the resin groove included in at least one other block disposed between the first block and the second block in an axial direction, the magnet includes a first magnet extending in a direction parallel to a tangential direction of the rotor core, the accommodation hole includes a first magnet accommodation hole that accommodates the first magnet, and the resin groove includes a first resin groove that is radially recessed from an inner surface of the first magnet accommodation hole, the first resin groove is disposed radially inward relative to the first magnet, and in plan view from an axial direction, a maximum width of the first resin groove in a direction parallel to the tangential direction is larger than a shortest distance in a radial direction between an inner surface of radial inward of the first magnet accommodation hole and the first magnet.

2. The rotor according to claim 1, wherein the first block and the second block have a mark for aligning circumferential positions, and the second block is the first block that is vertically inverted in an axial direction in an arrangement where circumferential positions of the first block and the mark are aligned with each other.

3. The rotor according to claim 2, wherein the rotor core further includes an insertion hole through which a shaft is inserted, an inner surface of the insertion hole is provided with an insertion hole side protrusion portion or recess portion that fits with a radially recessed shaft side recess portion provided in the shaft or a radially protruding shaft side protrusion portion provided in the shaft, and the mark is the insertion hole side protrusion portion or recess portion.

4. The rotor according to claim 2, wherein the first block and the second block are arranged side by side in contact with each other in an axial direction.

5. The rotor according to claim 2, wherein a block set in which the first block and the second block are arranged side by side in contact with each other in an axial direction is arranged line-symmetrically with respect to a bisecting plane that bisects the rotor core in an axial direction.

6. The rotor according to claim 2, wherein the rotor core includes at least one of the other blocks, and an arrangement of the magnetic poles of the rotor core is line-symmetric on an upper side and a lower side with respect to a bisecting plane that bisects the rotor core in an axial direction.

7. The rotor according to claim 1, wherein each of the first block and the second block has, on an inner surface of the accommodation hole, a positioning protrusion portion that determines a longitudinal position of the magnet in plan view from an axial direction, and in an axial direction of the accommodation hole of each block, a presence region of the positioning protrusion portion is smaller than an absence region of the positioning protrusion portion.

8. The rotor according to claim 1, wherein the first resin groove is semicircular in plan view from an axial direction.

9. The rotor according to claim 1, wherein in plan view from an axial direction, a position of the first resin groove is shifted from a center position of the first magnet accommodation hole in a direction parallel to the tangential direction.

10. The rotor according to claim 1, wherein the magnet includes a pair of second magnets that form a V-shape as a pair in plan view from an axial direction, the accommodation hole includes a pair of second magnet accommodation holes that accommodate the pair of second magnets, and the resin groove includes a second resin groove that is circumferentially recessed from an inner surface of each of the pair of second magnet accommodation holes.

11. The rotor according to claim 10, wherein an outer edge of the second magnet accommodation hole has a first outer edge portion and a second outer edge portion facing each other in a lateral direction of the second magnet in plan view from an axial direction, the first outer edge portion is disposed radially inward relative to the second outer edge portion, and the second resin groove is provided on an inner surface extending in an axial direction from the first outer edge portion.

12. The rotor according to claim 10, wherein in plan view from an axial direction, a length of the second resin groove in a direction orthogonal to a longitudinal direction of the second magnet is longer than a width of the second resin groove in a direction parallel to the longitudinal direction of the second magnet at least at either an upper end or a lower end in an axial direction.

13. The rotor according to claim 12, wherein the rotor core includes magnetic steel plates laminated in an axial direction, in the first block and the second block, end portion magnetic steel plates that are the magnetic steel plates at an axial upper end and lower end and an intermediate magnetic steel plate that is the magnetic steel plate disposed in an axial direction between the end portion magnetic steel plates at an axial upper end and lower end are different in a shape of a groove portion constituting the second resin groove, and the end portion magnetic steel plate has the groove portion extending longer in a circumferential direction than the groove portion of the intermediate magnetic steel plate.

14. The rotor according to claim 1, wherein the magnet further includes a pair of second magnets that form a V-shape as a pair in plan view from an axial direction, the accommodation hole further includes a pair of second magnet accommodation holes that accommodate the pair of second magnets, the resin groove further includes a second resin groove that is circumferentially recessed from an inner surface of each of the pair of second magnet accommodation holes, and at least a part of the first magnet is disposed radially outward relative to the pair of second magnets.

15. A rotating electrical machine comprising:

the rotor according to claim 1; and a stator disposed radially outward of the rotor.

16. A drive device comprising:

the rotating electrical machine according to claim 15; and a gear unit connected to the rotating electrical machine.

17. A rotor that is used in an inner rotor type rotating electrical machine and has a plurality of magnetic poles in a circumferential direction about a central axis extending vertically, the rotor comprising:

a magnet that constitutes each of the magnetic poles;

a rotor core that has an axially extending accommodation hole for accommodating the magnet; and a resin that is put into the accommodation hole, wherein the rotor core includes a first block, and a second block that is arrayed in an axial direction together with the first block and is arranged such that a circumferential position of the accommodation hole is shifted with respect to the first block, the first block and the second block each have a resin groove that communicates with the accommodation hole included in each block, extends from an axial upper end to lower end, and receives the resin, and the resin groove of the first block and the resin groove of the second block are at least partially overlapped and connected in an axial direction, or are connected via the resin groove included in at least one other block disposed between the first block and the second block in an axial direction, and the magnet includes a pair of second magnets that form a V-shape as a pair in plan view from an axial direction, the accommodation hole includes a pair of second magnet accommodation holes that accommodate the pair of second magnets, and the resin groove includes a second resin groove that is circumferentially recessed from an inner surface of each of the pair of second magnet accommodation holes.

18. The rotor according to claim 17, wherein an outer edge of the second magnet accommodation hole has a first outer edge portion and a second outer edge portion facing each other in a lateral direction of the second magnet in plan view from an axial direction, the first outer edge portion is disposed radially inward relative to the second outer edge portion, and the second resin groove is provided on an inner surface extending in an axial direction from the first outer edge portion.

19. The rotor according to claim 17, wherein in plan view from an axial direction, a length of the second resin groove in a direction orthogonal to a longitudinal direction of the second magnet is longer than a width of the second resin groove in a direction parallel to the longitudinal direction of the second magnet at least at either an upper end or a lower end in an axial direction.

20. The rotor according to claim 19, wherein the rotor core includes magnetic steel plates laminated in an axial direction, in the first block and the second block, end portion magnetic steel plates that are the magnetic steel plates at an axial upper end and lower end and an intermediate magnetic steel plate that is the magnetic steel plate disposed in an axial direction between the end portion magnetic steel plates at an axial upper end and lower end are different in a shape of a groove portion constituting the second resin groove, and the end portion magnetic steel plate has the groove portion extending longer in a circumferential direction than the groove portion of the intermediate magnetic steel plate.

21. A rotor that is used in an inner rotor type rotating electrical machine and has a plurality of magnetic poles in a circumferential direction about a central axis extending vertically, the rotor comprising:

a magnet that constitutes each of the magnetic poles;

a rotor core that has an axially extending accommodation hole for accommodating the magnet; and a resin that is put into the accommodation hole, wherein the rotor core includes a first block, and a second block that is arrayed in an axial direction together with the first block and is arranged such that a circumferential position of the accommodation hole is shifted with respect to the first block, the first block and the second block each have a resin groove that communicates with the accommodation hole included in each block, extends from an axial upper end to lower end, and receives the resin, and the resin groove of the first block and the resin groove of the second block are at least partially overlapped and connected in an axial direction, or are connected via the resin groove included in at least one other block disposed between the first block and the second block in an axial direction, and the magnet includes a first magnet extending in a direction parallel to a tangential direction of the rotor core, the accommodation hole includes a first magnet accommodation hole that accommodates the first magnet, and the resin groove includes a first resin groove that is radially recessed from an inner surface of the first magnet accommodation hole, the magnet further includes a pair of second magnets that form a V-shape as a pair in plan view from an axial direction, the accommodation hole further includes a pair of second magnet accommodation holes that accommodate the pair of second magnets, the resin groove further includes a second resin groove that is circumferentially recessed from an inner surface of each of the pair of second magnet accommodation holes, and at least a part of the first magnet is disposed radially outward relative to the pair of second magnets.

22. The rotor according to claim 21, wherein an outer edge of the second magnet accommodation hole has a first outer edge portion and a second outer edge portion facing each other in a lateral direction of the second magnet in plan view from an axial direction, the first outer edge portion is disposed radially inward relative to the second outer edge portion, and the second resin groove is provided on an inner surface extending in an axial direction from the first outer edge portion.

23. The rotor according to claim 21, wherein in plan view from an axial direction, a length of the second resin groove in a direction orthogonal to a longitudinal direction of the second magnet is longer than a width of the second resin groove in a direction parallel to the longitudinal direction of the second magnet at least at either an upper end or a lower end in an axial direction.

24. The rotor according to claim 23, wherein the rotor core includes magnetic steel plates laminated in an axial direction, in the first block and the second block, end portion magnetic steel plates that are the magnetic steel plates at an axial upper end and lower end and an intermediate magnetic steel plate that is the magnetic steel plate disposed in an axial direction between the end portion magnetic steel plates at an axial upper end and lower end are different in a shape of a groove portion constituting the second resin groove, and the end portion magnetic steel plate has the groove portion extending longer in a circumferential direction than the groove portion of the intermediate magnetic steel plate.

* * * * *